United States Patent [19]
Barber

[11] Patent Number: 5,135,176
[45] Date of Patent: Aug. 4, 1992

[54] METHOD OF RECYCLING OF OIL FILTERS

[76] Inventor: John Barber, 9446 Lechner Rd., Fort Worth, Tex. 76179

[21] Appl. No.: 772,781

[22] Filed: Oct. 7, 1991

[51] Int. Cl.⁵ .................. B02C 7/00; B02C 11/08
[52] U.S. Cl. .................................. 241/23; 241/24; 241/65
[58] Field of Search .................. 241/23, 24, 65, 77

[56] References Cited

U.S. PATENT DOCUMENTS

| | | | |
|---|---|---|---|
| 4,706,893 | 11/1987 | Brock | 241/65 X |
| 4,905,916 | 3/1990 | Sorwick et al. | 241/23 |
| 4,927,085 | 5/1990 | Oberg | 241/36 |
| 5,060,871 | 10/1991 | Brassinga et al. | 241/23 X |

OTHER PUBLICATIONS

Pollution Control Products Co., Controlled Pyrolysis (4 pp.).

*Primary Examiner*—Douglas D. Watts
*Attorney, Agent, or Firm*—James E. Bradley

[57] ABSTRACT

A method of recycling of oil filters utilizes a shredder and a thermal unit. The oil filters are shredded into metal and porous media particles. The shredded matter is placed in a thermal unit and heated. The heat will be sufficient to convert the porous media to an ash, but not sufficient to melt the steel. After heating for a sufficient duration, the shredded metal particles will be separated from the ash and recycled. The ash will also be recycled.

16 Claims, 1 Drawing Sheet

METHOD OF RECYCLING OF OIL FILTERS

BACKGROUND OF THE INVENTION

1. Field of the invention

This invention relates in general to recycling of used materials, and in particular to a method and assembly for reclaiming oil filters.

2. Description of the Prior Art

Most internal combustion engines use oil filters. The oil filter is used to clean the oil as it circulates through the engine. Oil filters are made up of a porous media of paper-like material contained within a metal canister. An elastomeric seal seals the oil filter to the engine. In some cases, epoxy holds the porous media in place within the filter. Debris will be trapped by the porous media as it circulates through the filter.

Normally, filters need to be changed at least every few thousand miles or every few months. Recycling of the filters is a problem. Most bulk waste is disposed of in landfills. An oil filter is not biodegradable. It will remain in the landfill, contaminating portions of the landfill with oil. This oil may seep into underground waters in the area.

As a result, regulations now restrict oil filters from being disposed of in landfills. Lubrication service business, fleet owners and the like have no easy means of recycling of the oil filters. The metal of the oil filter cannister is steel and potentially may be recycled. However, steel mills do not have means for recycling the metal because of the oil soaked filter media, elastomer and epoxies contained also within the filters. Steel mills require a much cleaner scrap metal for use than complete used oil filters.

SUMMARY OF THE INVENTION

In this invention, the oil filters will be collected and first placed on a vibrating conveyor. The vibrating conveyor vibrates the filter, assisting residual oil contained therein to flow into a drain and into a collecting tray.

Then, the filters are conveyed to a shredder which shreds the oil filters into shredded matter containing metal particles. The shredded matter will also contain bits of porous media, epoxy and elastomer. Preferably, this shredded matter will be placed onto another vibrating conveyor for draining additional amounts of oil from the shredded matter. The shredded matter is then dumped into a perforated basket.

Then, the basket containing the shredded matter will be placed in an oven or thermal unit. The thermal unit is of a type that has a lower chamber that will be maintained at a temperature sufficient to burn or convert the porous media, epoxy and elastomer into an ash. The lower chamber, however, is not sufficiently hot to melt the metal. The thermal unit has an upper chamber which is considerably hotter for burning off the emissions from the lower chamber.

After converting the shredded matter into an ash containing metal particles, the basket will be removed and the metal particles separated from the shredded matter. This can be handled by dumping the basket contents onto a perforated vibrating table. The ash falls through the perforations past a perforated magnet and into the container. The metal particles, now clean and substantially free of ash, will be taken to a recycling steel mill for recycling the steel. The ash also may be recycled.

DETAILED DESCRIPTION OF THE INVENTION

Figure 1A:
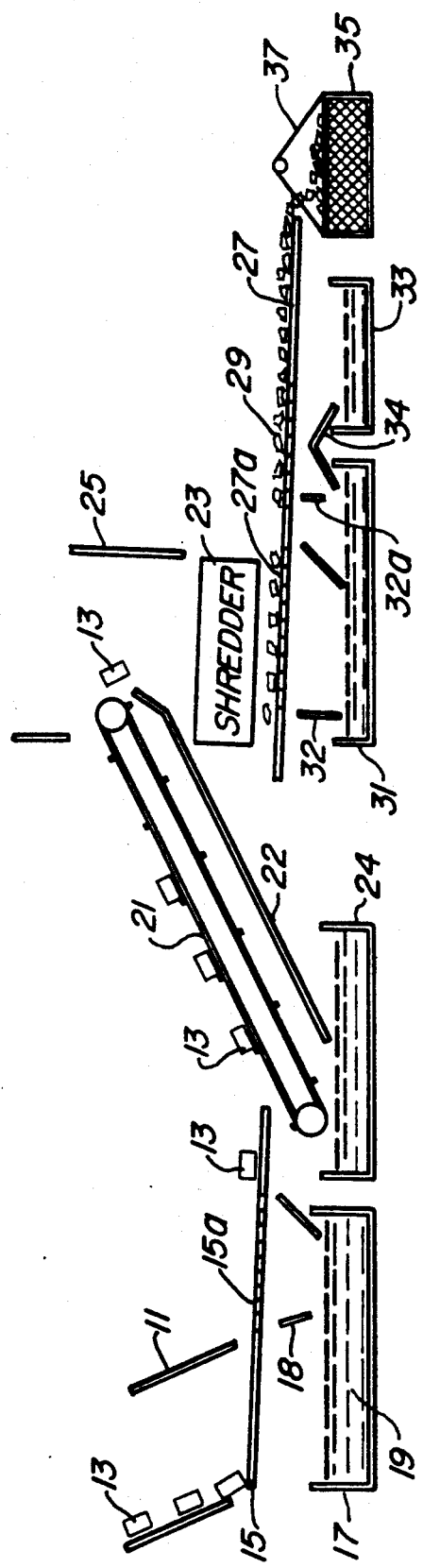
FIGS. 1a and 1b illustrates schematically a method and an assembly for recycling of oil filters.
Figure 1B:
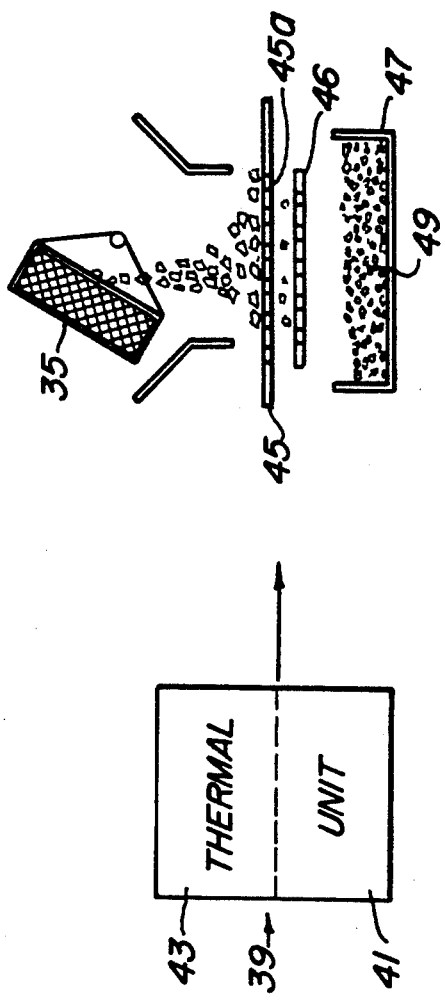

A hopper will be positioned to receive oil filters 13 collected by a truck. The oil filters 13 will be dumped into hopper 11, from which they will be received on a vibrating conveyor 15. Vibrating conveyor 15 will vibrate the filters 13 to facilitate the flow of any residual oil contained in filters 13. In one embodiment, vibrating conveyor 15 comprises a table having a perforated section 15a which serves as a drain for oil 19 to drain through a chute 18 and into a tank or tray 17. Vibrating conveyor 15 tilts downward slightly, causing the filters 13 to move in a forward direction.

Filters 13 will then drop from vibrating conveyor 15 onto a ramp conveyor 21. Ramp conveyor 21 has an oil drain 22 located below that drains additional residual oil into a tray 24. The filters 13 are conveyed upward and into the open upper end of a conventional shredder 23. Shredder 23 has a rotor (not shown) therein that rotates blades to shred the filters 13. A splash guard 25 contains any oil splash as the filters 13 fall off the upper end of the ramp conveyor 21 and pass through the shredder 23.

A second vibrating conveyor 27 will be located below the shredder 23 for receiving shredded matter 29. Vibrating conveyor 27 may be of the same type as vibrating conveyor 15. It has a drain, preferably two perforated sections 27a, for oil from shredded matter 29 to drain. The oil passes through two chutes 32, 32a into two trays 31, 33. A splitter 34 directs oils from the chute 32a into both trays 31, 33. Oil 19 in trays 17, 24, 31 and 33 will be subsequently cleaned and recycled in a conventional manner.

Shredded matter 29 is made up of metal particles and bits of porous media, elastomeric and epoxy. Because of tilting and oscillating motion, the shredded matter 29 will proceed in a forward direction along the vibrating conveyor 27. The shredded matter 29 will fall into a basket 35. Basket 35 is a perforated metal basket having fairly small holes, such as of an expanded metal. Basket 35 has a bale 37 so that it can be picked up by a crane.

Once full of shredded matter 29, a crane will lift basket 35 and place it in a thermal unit 39. Thermal unit 39 is a type of heater or oven that has a door that can be opened to place the basket 35 within. Thermal unit 39 is commercially available. It is preferably of a type that is used in assembly plants for burning off coatings of paint that build up on hooks and racks that are used in spray booths. These hooks and racks receive overspray which builds up, rendering them unusable eventually unless the paint is removed. One type of thermal unit available is manufactured by Pollution Control Products Company which has an office in Dallas, Tex.

The thermal unit 39 has a lower chamber 41 which contains the basket 35 and which is at a temperature high enough to disintegrate the epoxy, elastomer and porous media, but not high enough to melt the metal particles contained in the shredded matter 29. The temperature is preferably about 800 degrees F. Thermal unit 39 has an upper chamber 43 that receives the gaseous emissions from the lower chamber 41. The upper chamber 43 is maintained at a much higher temperature, preferably about 1625 degrees F. This higher temperature will burn the emissions resulting from the porous media, epoxy and oil to prevent pollution. Thermal unit 39 is operated as a batch type, and will heat the basket 35 and shredded matter 29 for about 20–22 hours, sufficient to cause all but the metal contained within the shredded matter 29 to convert into an ash.

Then, the metal must be separated from the ash. This is handled in the preferred embodiment by removing the basket 35 from thermal unit 39 and dumping the contents onto a vibrator 45 which has a perforated section 45a. The perforations 45a in the vibrator 45 are small enough so that most of the metal particles will not fall through them. The ash particles are much smaller, however, and will fall through the perforations 45a. A perforated electromagnet 46 locates below the vibrator 45. Magnet 46 will remove any metal particles that have fallen through the basket 35.

Magnet 46 will be positioned above a container 47. The ash 49 will pass through the perforations in magnet 46 and collect in the container 47. The ash 45 can be recycled for use in concrete pavement. The metal particles will be removed from basket 35 and taken to a steel mill for conventional recycling.

The invention has significant advantages. The assembly will dispose of the filters in a clean environment. All re-usable components of the filters will be recycled.

While the invention has been shown in only one of its forms, it should be apparent to those skilled in the art that it is not so limited, but is susceptible to various changes without departing from the scope of the invention.

I claim:

1. A method for recycling of oil filters of a type having a metal canister containing a porous media, the method comprising:

shredding the filters into a shredded matter of metal and porous media particles;

placing the shredded matter in a thermal unit;

heating the shredded matter in the thermal unit to a temperature sufficient to convert the porous media into an ash, but not sufficient to melt the metal particles; then separating the ash from the metal particles and recycling the metal particles.

2. The method according to claim 1, further comprising draining oil from the filters which comprises:

providing a vibrating device having a drain and a tray located therebelow; and placing the filters on the vibrating device, and vibrating the vibrating device to cause oil to flow from the filters, through the drain and into the tray.

3. The method according to claim 1 further comprising draining oil from the shredded matter prior to placing the shredded matter within the thermal unit.

4. The method according to claim 1 further comprising draining oil from the shredded matter prior to placing the shredded matter within the thermal unit by providing a vibrating device having a drain and a tray located therebelow; and placing the shredded matter on the vibrating device, and vibrating the vibrating device to cause oil to flow from the shredded matter, through the drain and into the tray.

5. The method according to claim 1, further comprising draining oil from the filters which comprises:

providing a first vibrating device having perforations therethrough and a first tray located therebelow; and placing the filters on the first vibrating device, and vibrating the first vibrating device to cause oil to flow from the filters, through the perforations and into the first tray; the method further comprising:

draining oil from the shredded matter prior to placing the shredded matter within the thermal unit by providing a second vibrating device having perforations therethrough and a second tray located therebelow; and placing the shredded matter on the second vibrating device, and vibrating the second vibrating device to cause oil to flow from the shredded matter, through the perforations and into the second tray.

6. The method according to claim 1 wherein the step of placing the shredded matter in the thermal unit comprises placing the shredded matter in a metal basket and placing the basket in the thermal unit.

7. The method according to claim 1 wherein the step of placing the shredded matter in the thermal unit comprises placing the shredded matter in a metal basket and placing the basket in the thermal unit; and wherein the step of separating the ash from the metal particles comprises:

providing a vibrating device having perforations therethrough and a container located therebelow;

removing the basket from the thermal unit; then placing the ash and metal particles from the basket on the vibrating device; and vibrating the vibrating device to cause the ash to fall through the perforations of the vibrating device and into the container, with the metal particles remaining on the vibrating device.

8. A method for recycling of oil filters of a type having a metal canister containing a porous media, the method comprising:

providing a vibrating device having a drain and a tray located therebelow;

placing the filters on the vibrating device, and vibrating the vibrating device to cause oil to flow from the filters, through the drain and into the tray; then shredding the filters into a shredded matter of metal and porous media particles;

placing the shredded matter in a thermal unit;

heating the shredded matter in the thermal unit to a temperature sufficient to convert the porous media into an ash, but not sufficient to melt the metal particles; then separating the ash from the metal particles and recycling the metal particles.

9. The method according to claim 8 further comprising draining oil from the shredded matter prior to placing the shredded matter within the thermal unit.

10. The method according to claim 8 further comprising draining oil from the shredded matter prior to placing the shredded matter within the thermal unit by providing a second vibrating device having a drain and a second tray located therebelow; and placing the shredded matter on the second vibrating device, and vibrating the second vibrating device to cause oil to flow from the shredded matter, through the drain and into the second tray.

11. The method according to claim 8 wherein the step of placing the shredded matter in the thermal unit comprises placing the shredded matter in a metal basket and placing the basket in the thermal unit.

12. The method according to claim 8 wherein the step of placing the shredded matter in the thermal unit comprises placing the shredded matter in a metal basket and placing the basket in the thermal unit; and wherein the step of separating the ash from the metal particles comprises:
  providing a vibrating device having perforations therethrough and a container located therebelow;
  removing the basket from the thermal unit; then
  placing the ash and metal particles from the basket on the vibrating device;
  vibrating the vibrating device to cause the ash to fall through the perforations of the vibrating device and into the container, with the metal particles remaining on the vibrating device; and
  placing a magnet below the vibrating device and above the container for attracting metal particles that fall through the perforations of the vibrating device.

13. An assembly for recycling of oil filters of a type having a metal canister containing a porous media, the assembly comprising in combination:
  first vibrating means having a drain and a tray located therebelow for vibrating filters to cause oil to flow from the filters, through the drain and into the tray;
  shredding means for shredding the filters into a shredded matter of metal and porous media particles;
  thermal unit means for receiving the shredded matter and for heating the shredded matter at a temperature and for a time sufficient to convert the porous media into an ash, but not sufficient to melt the metal particles; and
  separating means for separating the ash from the metal particles for recycling the metal particles.

14. The assembly according to claim 13 further comprising a second vibrating means for vibrating the shredded matter to cause oil to drain from the shredded matter prior to placing in the thermal unit means.

15. The assembly according to claim 13 wherein the separation means comprises a third vibrating means for vibrating the ash and metal particles, the third vibrating means having perforations therethrough which are larger than particles of the ash and which are smaller than particles of metal, allowing the ash to fall through the perforations to separate the particles of metal from the ash.

16. The assembly according to claim 15 separation means further comprises a magnet mounted below the third vibrating means for attracting any metal particles that fall through the perforations of the third vibrating means.

* * * * *